Patented May 26, 1936

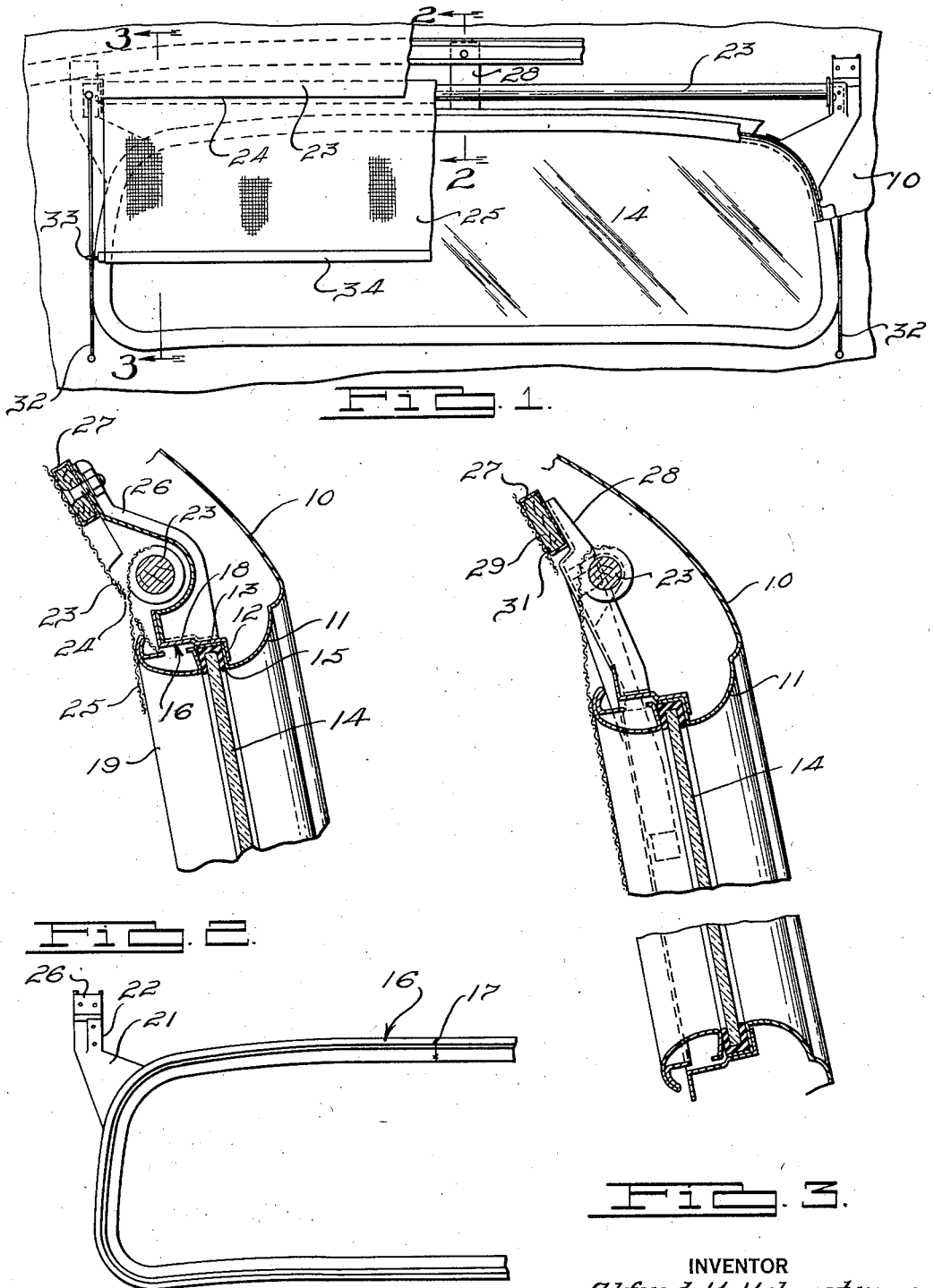

2,041,757

UNITED STATES PATENT OFFICE 2,041,757

VEHICLE BODY

Alfred H. Haberstump, Detroit, Mich., assignor to The Murray Corporation of America, a corporation of Delaware Application November 24, 1933, Serial No. 699,508

12 Claims. (Cl. 296—44)

My invention relates to vehicle bodies and particularly to the window construction thereof.

Heretofore it has been the practice to strengthen the reveal portion of the panel at a window opening by building a frame within the body to which the edge of the reveal is secured. The reinforcing portions were made of wood or metal, or a combination thereof and were a unit construction which nested in the back of the body and was secured in such manner as to be supported rigidly therein to strengthen the body and to provide support for the window reveal edge.

In practicing my invention, I employ a rolled metal section supported to the edge of the panel to provide sufficient strength thereto to support the window glass and frame as well as the upholstering material. This eliminates the unit frame structure which was built from the floor upwardly about the window opening. As a further extension of my invention, I have provided brackets on the rolled section which project upwardly above the window opening and which support a window shade. The window shade and brackets are hidden by the inner finish trim of the body except for the end of the curtain which projects through a slot therein. The brackets may be further extended upwardly to support a trim tacking strip which extends laterally across the body above the window opening to which the finish cloth material is secured by tacks, all of which materially simplifies the rear end construction of a vehicle body.

Accordingly, the main objects of my invention are; to strengthen the marginal edge of the reveal portion of a window opening of a body by providing a frame which encompasses the edge and adds strength thereto; to provide a strengthening frame for the marginal edge of a window opening which is constructed of a piece of metal to have at least three web portions which are rolled to the shape of the window; to provide brackets on the reinforcing frame upon which a window shade is supported above the window opening rearwardly of the finish trim of the vehicle; to provide a slot in the trim through which the shade extends and is operated; to provide extensions on the brackets which support a tacking strip to which the inner finish strip of the vehicle is secured above the window opening; and, in general, to reinforce the marginal edge at the window opening in such manner as to simplify the construction, materially reduce the weight of the rear of the vehicle and provide support for the window shade as well as the tacking strip for the inner trim.

Other objects and features of novelty of my invention will be either specifically pointed out or will become apparent when referring, for a better understanding of my invention, to the following description taken in conjunction with the accompanying drawing, wherein:

Figure 1 is a broken view, in elevation, of a vehicle body embodying features of my invention.

Fig. 2 is an enlarged sectional view of the structure illustrated in Fig. 1, taken on the line 2—2 thereof.

Fig. 3 is an enlarged sectional view of the structure illustrated in Fig. 1, taken on the line 3—3 thereof, and Fig. 4 is a broken view, in elevation, of the reinforcing element which is employed in the structure of the foregoing figures.

In the figures, I have illustrated a vehicle body 10 the rear panel of which is flanged inwardly at 11 forming a reveal portion about a window opening and further flanged at 12 and 13 to provide a rabbet for receiving the rear window glass 14. A suitable resilient channel strip 15 is disposed in the rabbet about the window glass edges for the purpose of sealing the edges and protecting the glass against shock and jar. To add strength to the flanges 12 and 13 I have provided a frame 16 which is of Z section and which is rolled in the shape of the window opening as defined by the flange 13. The edges of the frame 16 meet preferably at 17 in off center relation from the center line of the body, in view of which separation the frame 16 is readily assembled about the flanges 12 and 13. The frame 16 is preferably welded or otherwise secured in fixed relation to the frame. The frontwardly extending portion 18 of the frame 16 provides a ledge upon which the inner finish frame 19 is secured. The frame 19 abuts against the sealing element 15 and retains the glass 14 in place. The frame 19 is removable to permit a new glass to be inserted when broken.

As a further extension of the invention, brackets 21 are secured at the top edge of the frame 16, having a window shade supporting element 22 thereon which supports a window shade 23. The window shade is supported directly above the window opening and is hidden from view by the finish material 23 secured thereover. A slot 24 is provided in the finish material 23 through which the curtain 25 of the shade projects and operates to extend over the window, as illustrated in Fig. 1.

For retaining the finish material 23 in place I have provided extensions 26 on the bracket 21 to which a tacking strip 27 is secured. The tacking strip is supported at the center by an element 28 which is disposed on the centerline of the panel. In view of the securing of the element 28 at the centerline, the junction 17 was offset therefrom so that greater strength will be provided to the supporting element 28.

The tacking strip is made of channel section having a material 29 therein which may be wood, paper, fiber or the like into which tacks may be driven and is retained in the channel by the flanging over of the edge 31 of the channel backing portion. The finish material 23 is secured directly to the element by tacks as is apparent from Figs. 2 and 3. In this construction, the frame 16 not only strengthens the edge of the reveal portion 11 of the paneling but also is the support for the window shade and the tacking strip which supports the inner finish material of the vehicle to hide the shade from view.

Suitable guide strings 32 are provided on the inner rear portion of the vehicle at the sides of the window opening which project through eyes 33 in the end cross rods 34 of the curtain shade to retain the shade against the rear body trim material when in any of its adjusted positions.

The employment of the unit rolled metal frame 16 materially strengthens the edge of the inturned flange portion about the window opening in the vehicle body and, while I have illustrated and described its application to a rear window, it is to be understood that it could be employed on any or all of the windows of the vehicle body. The brackets which are secured to the rolled section by welding, riveting, bolting or other means, support the window shade so that it can be concealed by the finish material, the curtain alone being visible, projecting through a slot in the material. The brackets are further extended to support the tacking strip for the top finish material and in this manner the brackets not only function to strengthen the edge of the paneling at the window opening but is also the support for the tacking strip and the window shade. A material saving in cost of material and labor as well as a decreased weight of the body results from this construction. The heavy reinforcing structure heretofore employed extending from the floor of the car upwardly about the window opening was made of heavy sheet material or of heavy pieces of wood which thereby added materially to the weight of the vehicle.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. A vehicle body formed of sheet metal having a window opening, the metal at the marginal edge being preformed inwardly to provide a window reveal, a rolled metal section of the shape of said marginal edge of the reveal joined thereto to reinforce said edge and to provide a ledge inwardly of said reveal the inner edge of which is unsupported and an inner frame supported on said ledge for completing a glass receiving channel at the marginal edge of the opening.

2. A vehicle body formed of sheet metal having a window opening defined by an inwardly pressed reveal portion the edges of which are formed laterally and then inwardly to provide a ledge for receiving a window glass, a rolled section of Z shape which is formed to encompass the ledge and provide a second ledge projecting inwardly therefrom, and an inner frame supported by said second ledge to form a complete channel with the edges of the reveal portion.

3. A vehicle body formed of sheet metal having a window opening defined by an inwardly pressed reveal portion the edges of which are formed laterally and then inwardly to provide a ledge for receiving a window glass, a rolled section of Z shape which is formed to encompass the ledge and providing a second ledge projecting inwardly therefrom, an inner frame supported by said second ledge to form a complete channel with the edges of the reveal portion, brackets provided on said rolled section, and a tacking strip for the inner finish material of the body supported by said brackets.

4. A vehicle body formed of sheet metal having a window opening defined by an inwardly pressed reveal portion the edges of which are formed laterally and then inwardly to provide a ledge for receiving a window glass, a frame formed in the shape of said ledge and secured thereto and providing a second ledge projecting inwardly therefrom and an inner frame supported by said second ledge to form a complete channel with the edges of the reveal portion, brackets secured to said first frame, and a window shade supported on said brackets.

5. A vehicle body formed of sheet metal having a window opening defined by an inwardly pressed reveal portion the edges of which are formed laterally and then inwardly to provide a ledge for receiving a window glass, a frame secured to said ledge and providing a second ledge projecting inwardly therefrom, an inner frame supported by said second ledge to form a complete channel with the edges of the reveal portion.

6. A vehicle body formed of sheet metal having a window opening defined by an inwardly pressed reveal portion the edges of which are formed laterally and then inwardly to provide a ledge for receiving a window glass, a frame secured to said ledge providing a second ledge projecting inwardly therefrom, an inner frame supported by said ledge to form a complete channel with the edges of said reveal portion, brackets secured to said reinforcing frame, a window shade supported by said brackets, a tacking strip retained by said brackets, and inner finish material secured to said tacking strip and at the marginal edge of the window for covering said brackets and window shade, said finish material having a slot therein through which the curtain of said shade extends.

7. A rolled section supported at the marginal edge of a window opening of a vehicle body for providing strength thereto, said section having an inwardly extending ledge for supporting an inner frame element, brackets secured on the top, side corners of said section, and a window shade supported by said brackets above the window opening.

8. A rolled section supported at the marginal edge of a window opening of a vehicle body for providing strength thereto, said section having an inwardly extending ledge for supporting an inner frame element, brackets secured on the top, side corners of said section, a window shade supported by said brackets, a tacking strip also supported by said brackets, and a finish material secured to said tacking strip.

9. A frame supported at the edge of a panel defining a window opening of a vehicle body to provide strength thereto, said frame having an inwardly extending ledge for supporting an inner removable frame element, brackets secured on the top, side corners of said first frame, and a window shade supported by said brackets above the window opening.

10. A frame supported at the edge of a panel defining a window opening of a vehicle body to provide strength thereto, said frame having an inwardly extending ledge for supporting an inner removable frame element, brackets secured on the top, side corners of said first frame, a window shade supported by said brackets above the window opening, a tacking strip also supported by said brackets, and a finish material secured to said tacking strip.

11. In a vehicle body construction formed of sheet metal and having a window opening therein, the metal at the marginal edges of said opening being preformed to provide the bottom and one side wall of a window receiving channel, a reinforcing member surrounding said window opening and preformed to mate with the bottom and side wall of said window receiving channel, and secured thereto.

12. In a vehicle body construction formed of sheet metal and having a window opening therein, the metal at the marginal edges of said opening being preformed to provide the bottom and one side wall of a window receiving channel, a reinforcing member surrounding said window opening and preformed to mate with the bottom and side wall of said window receiving channel and a garnish molding mounted on said reinforcing member and constituting the opposite side wall of said window receiving channel.

ALFRED H. HABERSTUMP.